United States Patent
Kikuchi

[11] 4,431,275
[45] Feb. 14, 1984

[54] OPTICAL RECORDING AND READ-OUT LENS SYSTEM FOR OPTICAL RECORDING TYPE DISKS

[75] Inventor: Juro Kikuchi, Hachiooji, Japan
[73] Assignee: Olympus Optical Co., Ltd., Tokyo, Japan
[21] Appl. No.: 433,442
[22] Filed: Oct. 8, 1982
[30] Foreign Application Priority Data
 Oct. 26, 1981 [JP] Japan .................. 56-170159
[51] Int. Cl.³ .................................. G02B 9/06
[52] U.S. Cl. .......................... 350/480; 350/410; 350/414
[58] Field of Search ............... 350/410, 414, 479, 480
[56] References Cited
 U.S. PATENT DOCUMENTS

| | | | |
|---|---|---|---|
| 1,968,222 | 7/1934 | Richter | 350/480 |
| 2,528,468 | 10/1950 | Cojan | 350/480 |
| 2,637,245 | 5/1953 | Ludewig | 350/410 |
| 4,029,398 | 6/1977 | Koizumi | 350/480 |
| 4,270,843 | 6/1981 | Goto | 350/480 |

FOREIGN PATENT DOCUMENTS

| | | |
|---|---|---|
| 50-124660 | 9/1975 | Japan . |
| 51-18557 | 2/1976 | Japan . |
| 51-66843 | 6/1976 | Japan . |
| 51-133046 | 11/1976 | Japan . |
| 52-44209 | 11/1977 | Japan . |
| 55-4068 | 1/1980 | Japan . |

Primary Examiner—John K. Corbin
Assistant Examiner—Scott J. Sugarman
Attorney, Agent, or Firm—Cushman, Darby & Cushman

[57] ABSTRACT

An optical recording and read-out lens system for optical recording type disks comprising a first and second lens components, the first lens component being a cemented lens consisting of three lens elements, i.e., a biconvex lens, biconcave lens and biconvex lens, the second lens component being a positive meniscus lens, the optical recording and read-out lens system having large NA, long working distance and well corrected aberrations especially chromatic aberration, and being small in size and light in weight.

8 Claims, 8 Drawing Figures

OPTICAL RECORDING AND READ-OUT LENS SYSTEM FOR OPTICAL RECORDING TYPE DISKS

BACKGROUND OF THE INVENTION (a) Field of the Invention

The present invention relates to an optical recording and read-out lens system to be used for recording signals onto optical recording type disks such as digitally recorded audio disks, video disks, etc. and for reading out signals recorded on optically recorded disks.

(b) Description of the Prior Art

As a recording and read-out method for optical recording type disks, there is such method to use two different wavelengths of light, one wavelength of light being used for control such as tracking and focusing and for reading out of signals and the other wavelength of light being used for recording of signals.

In this method, such operations are performed that the recorded signals are read out just after recording, it is judges whether they are correct or not, and correction is made when an incorrect signal is found. Therefore, for the lens system to be used in this method, chromatic aberration should be corrected so that the focal length becomes the same for both of the two different wavelengths of light to be used.

Besides, to increase the energy efficiency at the time of recording and to form a sharp pit, it is desirable to make the size of light spot on the disk small. For this purpose, the lens system sould have N.A. of 0.5 or more and its aberrations should be corrected very favourably.

Moreover, the disk rotating at high speed generally causes vertical vibration, horizontal vibration, irregular rotation, etc. To follow up these high speed movements, focusing and tracking are carried out by moving the lens system and, in some driving methods, correction of irregular rotation is also carried out by moving the lens system. Therefore, the optical recording type disks should be small in size and light in weight.

Moreover, to prevent the optical recording and read-out lens system from contacting the disk even when misoperation occurs, the working distance of the lens system should be made long. To reduce the loss in intensity of light to be caused by the optical recording and read-out lens system, the number of lenses constituting the lens system should be made small and, at the same time, surfaces of lenses which are in contact with air should be provided with antireflection coatings which are effective over the range of wavelengths of light to be used.

However, among known lens systems for optically recorded disks, there is almost no lens system which fulfills all of the above-mentioned requirements. For example, in cases of lens systems disclosed in Japanese published unexamined patent application Nos. 124660/75 and 66843/76, correction of chromatic aberration is not considered especially and, therefore, chromatic aberration is not corrected satisfactorily favourably.

The lens system disclosed in Japanese published unexamined patent application No. 133046/76 is designed for the purpose of the use with the light of short wavelength. Therefore, all lenses constituting the lens system are arranged separately from each other in order to prevent absorption of light by a cemented surface and, consequently, the lens system is large in size.

In cases of lens system disclosed in Japanese published unexamined patent application No. 18557/76 and lens system disclosed in Japanese published unexamined patent application No. 4068/80, which has lens configuration as shown in FIG. 1, a cemented doublet is used in order to eliminate chromatic aberration. However, the main purpose of using the cemented doublet is to make the lens system small in size and light in weight. Therefore, chromatic aberration is not eliminated satisfactorily.

Besides, in cases of the above-mentioned known lens systems, the working distance is short except the lens system according to Japanese published unexamined patent application No. 4068/80.

Among the known lens systems mentioned so far, there is almost no lens system which fulfills all of the requirements for an optical recording and read-out lens system for optical recording type disk. Especially, chromatic aberration is favourably corrected for very few of those lens system.

SUMMARY OF THE INVENTION

It is, therefore, a primary object of the present invention to provide an optical recording and read-out lens system for optical recording type disks which has large N.A. and working distance, of which aberrations, especially chromatic aberration, are corrected favourably, and which is small in size and light in weight.

As a small and light-weight lens system with a long working distance of which only paraxial aberrations are corrected, the lens system with two-component three-element lens configuration as shown in FIG. 1 is known as mentioned before. In case of said lens system, chromatic aberration is not corrected favourably. To correct chromatic aberration favourably for this type of lens system, it is necessary to use glass materials with large Abbe's numbers for convex lenses and glass material with a small Abbe's number for the concave lens. However, with the glass materials existing at present, the refractive index generally becomes small when Abbe's number becomes large. Therefore, when glass materials with large Abbe's numbers are used for convex lenses, refractive indices of those convex lenses become small. To give the desired powers to the convex lenses, it is therefore necessary to make radii of curvature of those convex lenses small. As a result, aberrations increase and it becomes impossible to obtain a lens system with a large N.A.

In the lens system according to the present invention, glass materials with large refractive indices are used for convex lenses and, moreover, four-element lens configuration is adopted in order to correct chromatic aberration.

To make N.A. large, the lens arranged closest to the disk side should be designed as a meniscus lens. When the thickness of this meniscus lens becomes large, the working distance becomes small. Therefore, it is necessary to make this meniscus lens as thin as possible within the range where it does not become inconvenient for the manufacture. Therefore, the lens system according to the present invention is arranged as a lens system with two-component four-element lens configuration containing a cemented lens component consisting of three lens elements.

As described in the above, the lens system according to the present invention comprises a first and second lens components in the order from the light-source side as shown in FIG. 2 wherein the first lens component is arranged as a cemented lens component consisting of three lens elements, i.e., the first, second and third lens elements in the order from the light source side, the first lens element being a biconvex lens, the second lens element being a biconcave lens, the third lens element being a biconvex lens, and wherein the second lens component comprises a fourth lens element, which is a positive meniscus lens arranged to be concave toward the disk side, the lens system according to the present invention being further arranged to fulfill the following conditions:

$$0.8 < f^2/|r_2 \cdot r_3| < 1.4 \tag{1}$$

$$1.2 < f_4/f < 1.6 \tag{2}$$

$$(n_1 - 1)\nu_1 + (n_3 - 1)\nu_3 \geq 50 \tag{3}$$

wherein reference symbol f represents the focal length of the lens system as a whole, reference symbol $f_4$ represents the focal length of the second lens component (the fourth lens element), reference symbols $r_2$ and $r_3$ respectively represent radii of curvature of cemented surfaces of the first lens component (cemented surface between the first and second lens elements and cemented surface between the second and third lens elements), reference symbols $n_1$ and $n_3$ respectively represent refractive indices of the lens element arranged on the light-source side (the first lens element) and lens element arranged on the disk side (the third lens element) in the first lens component, and reference symbols $\nu_1$ and $\nu_3$ respectively represent Abbe's numbers of the first and third lens elements.

Out of the conditions shown in the above, the condition (1) is established for the purpose of overcorrecting spherical aberration and chromatic aberration by balancing the radius of curvature $r_2$ of the cemented surface between the first and second lens elements in the first lens component, which is arranged as a cemented lens component consisting of three lens elements, with the radius of curvature $r_3$ of the cemented surface between the second and third lens elements therein in order to offset spherical aberration and chromatic aberration to be caused by the second lens component (fourth lens element), which is arranged as a single lens. Another purpose of the condition (1) is to balance coma of the lens system as a whole.

If, in the condition (1), $f^2/|r_2 \cdot r_3|$ becomes large and exceeds the upper limit thereof, i.e., 1.4, positive spherical aberration caused by the first lens component and negative spherical aberration caused by the second lens component will be unbalanced. As a result, spherical aberration of the lens system as a whole swells and it is impossible to obtain a favourable light spot. If, on the contrary, $f^2/|r_2 \cdot r_3|$ becomes smaller than the lower limit, i.e., 0.8, it becomes difficult to make the first lens component cause positive chromatic aberration which satisfactorily balances with negative chromatic aberration caused by the second lens component. Besides, if $f^2/|r^2 \cdot r_3|$ becomes larger than the upper limit or smaller than the lower limit of the condition (1), the value of coma tends to vary largely in either case, and this is not desirable for the design and manufacture.

The condition (2) is established for the purpose of making the working distance long by keeping spherical aberration and coma small.

In the lens system according to the present invention, both of the first and second lens components have positive powers and the distance between the principal points of the first and second lens components also have a positive value. Therefore, the working distance of the lens system becomes short when the focal length $f_4$ of the second lens component (the fourth lens element) is made long as it is evident from the calculation in the range of paraxial theory. Due to the above-mentioned reason, it becomes impossible to obtain a sufficient working distance if $f_4/f$ becomes larger than the upper limit of the condition (2).

When, on the contrary, the focal length $f_4$ is made short, spherical aberration and coma to be caused by the second lens component become large though the working distance becomes long. Besides, when $f_4$ is made small, the focal length of the first lens component becomes close to infinity. Therefore, the first lens component loses its function to correct spherical aberration and coma, i.e., it loses its main function. Due to the above-mentioned reason, it becomes impossible to correct spherical aberration and coma if $f_4/f$ becomes smaller than the lower limit of the condition (2).

The condition (3) is established for the purpose of eliminating chromatic aberration of the lens system.

The lens system according to the present invention is arranged to correct chromatic aberration of the lens system as a whole by overcorrecting spherical aberration at the first lens component which is arranged as a cemented lens component consisting of three lens elements. That is, the condition (3) is to overcorrect chromatic aberration by the two biconvex lenses (the first and third lens elements) in the first lens component.

As the lens system according to the present invention is to be used with a narrow range of wavelength, it is almost sufficient for elimination of chromatic aberration when consideration is given only to selection of Abbe's numbers. However, for in Abbe's numbers of glass materials existing at present, there are the upper limit and lower limit. Moreover, there is such tendency that glass materials with high refractive indices have small Abbe's numbers. On the other hand, to reduce spherical aberration and coma of the lens system as a whole, it is necessary to compose the lens system as a whole by using such glass materials of which refractive indices are high on an average. When these are taken into consideration, the glass material for the concave lens (second lens element) in the first lens component should be selected out of such glass material group having the smallest Abbe's numbers among the glass materials existing at present. However, even when the glass material for the second lens element is selected out of glass material group having the smallest Abbe's numbers among the glass materials existing at present, the first and third lens elements should be arranged to fulfill the condition (3) when it is desired to overcorrect chromatic aberration at the first lens component, which is a cemented lens component consisting of three lens elements. If the condition (3) is not fulfilled, it is impossible to correct chromatic aberration of the lens system as a whole due to the above-mentioned reason.

Besides, when the thickness of the cover glass becomes larger, it is preferable to make $r_6/f$ ($r_6$ represents the radius of curvature of the surface on the disk side of second lens component) larger for easier correction of coma. Moreover, for correction of chromatic aberration, it is preferable that Abbe's number $\nu_2$ of the second lens element is smaller than 35.

DETAILED DESCRIPTION OF THE PREFERRED EMBODIMENTS

Figure 1:
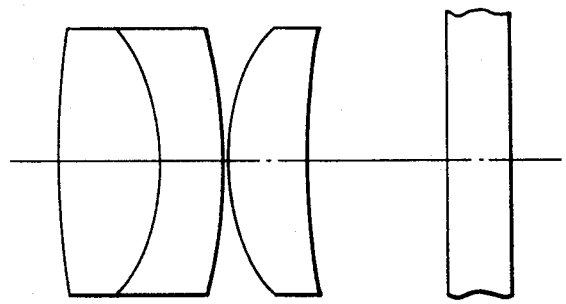
FIG. 1 shows a sectional view of a known lens system for optical recording type disks.
Figure 2:
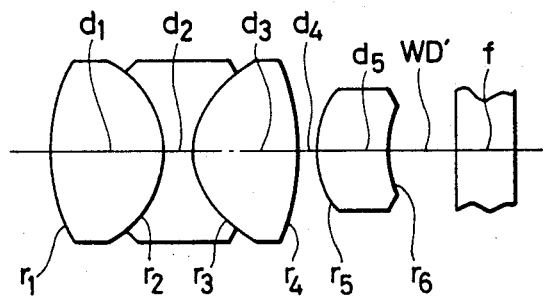
FIG. 2 shows a sectional view of the lens system according to the present invention.
Figure 3:
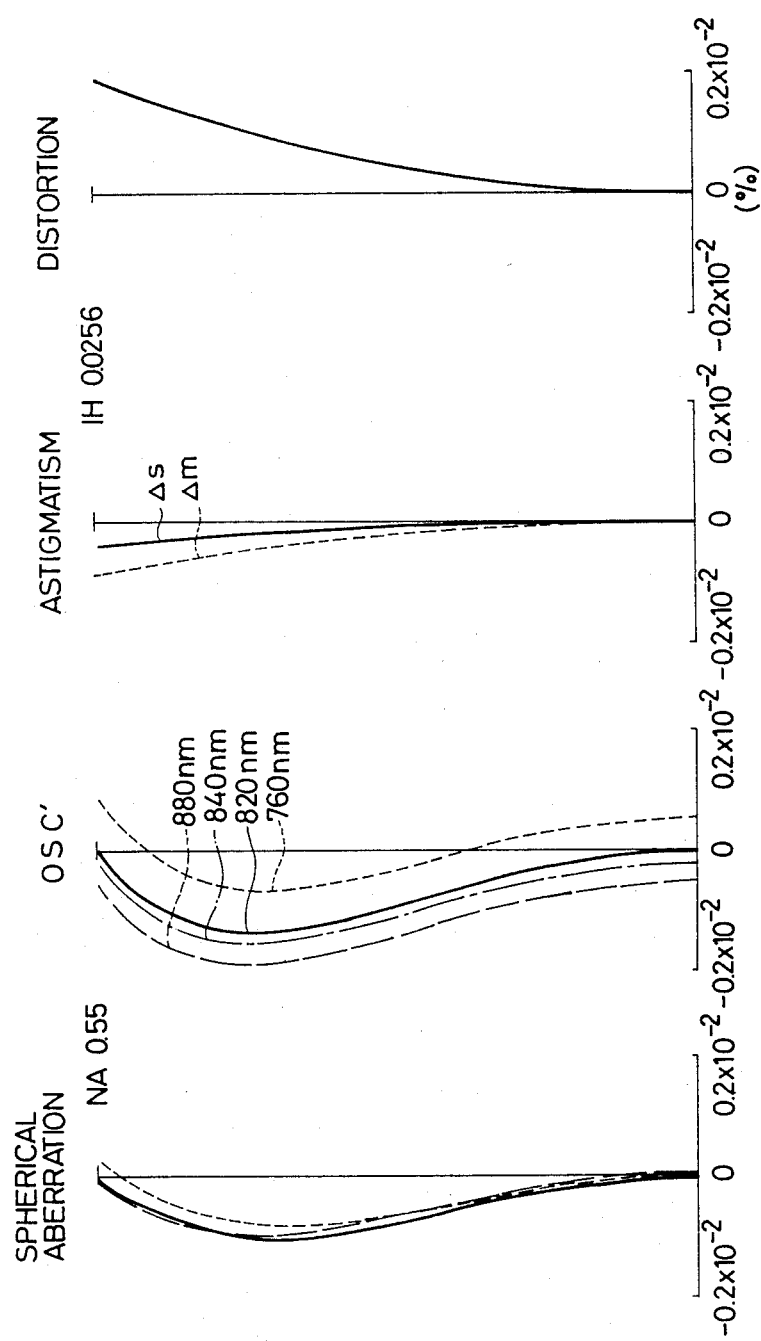
FIGS. 3 through 8 respectively show graphs illustrating aberration curves of Embodiments 1 through 6 of the present invention.
Figure 4:
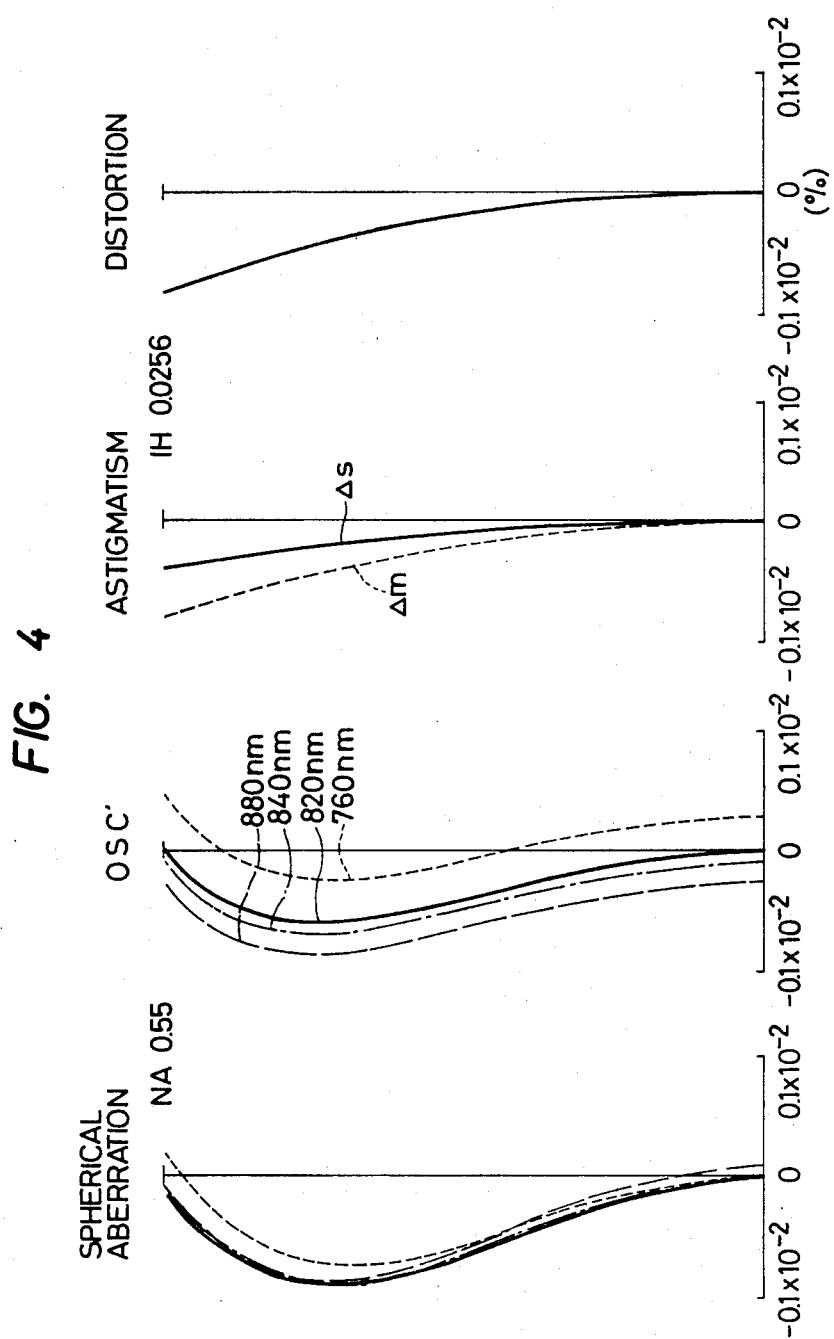
Figure 5:
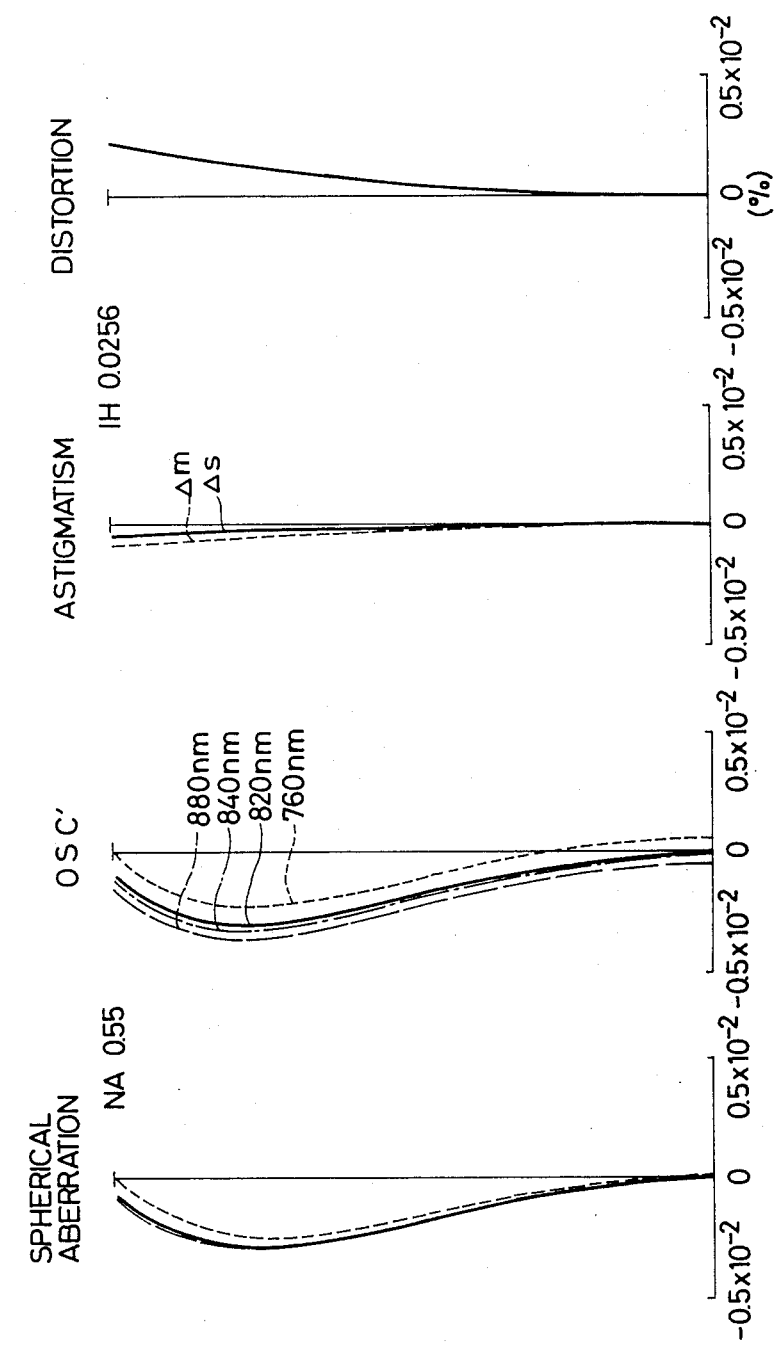
Figure 6:
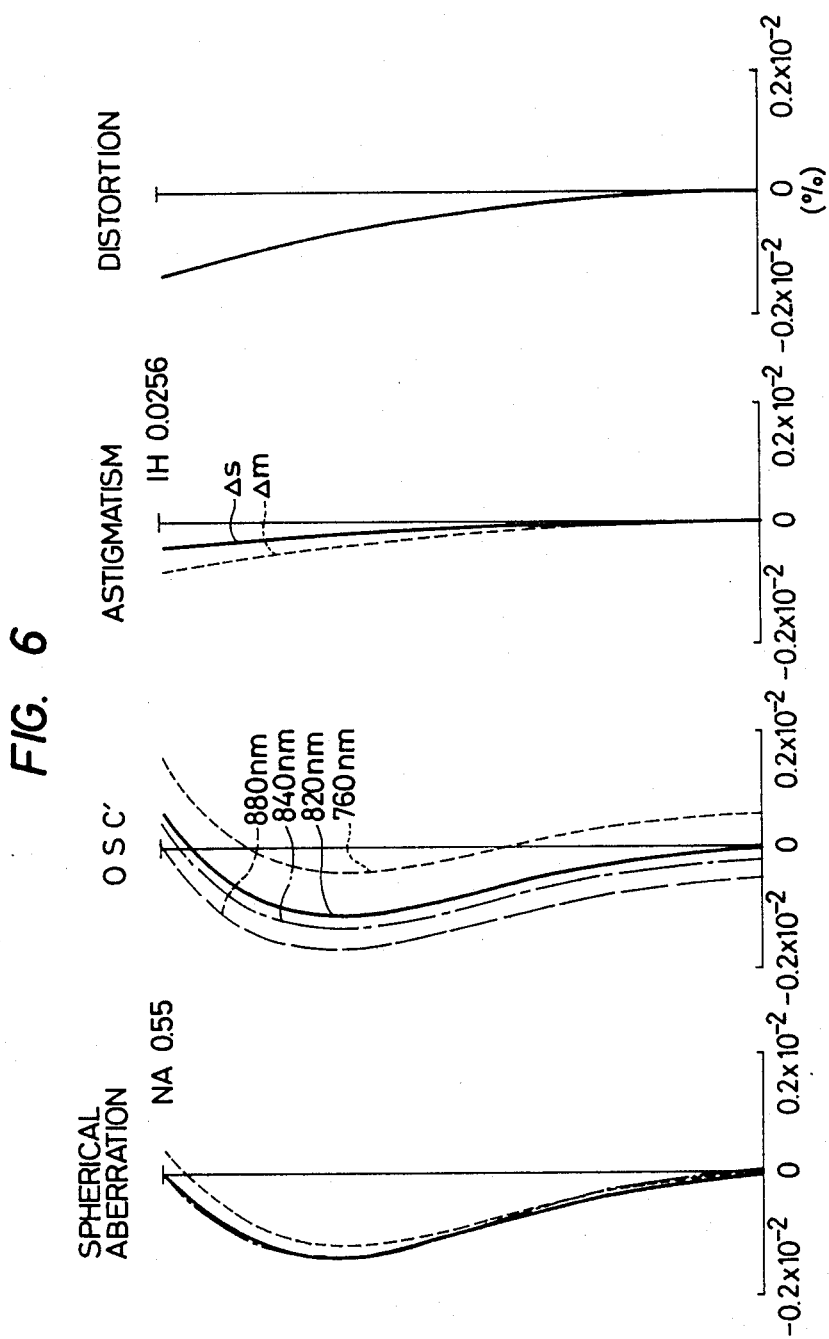
Figure 7:
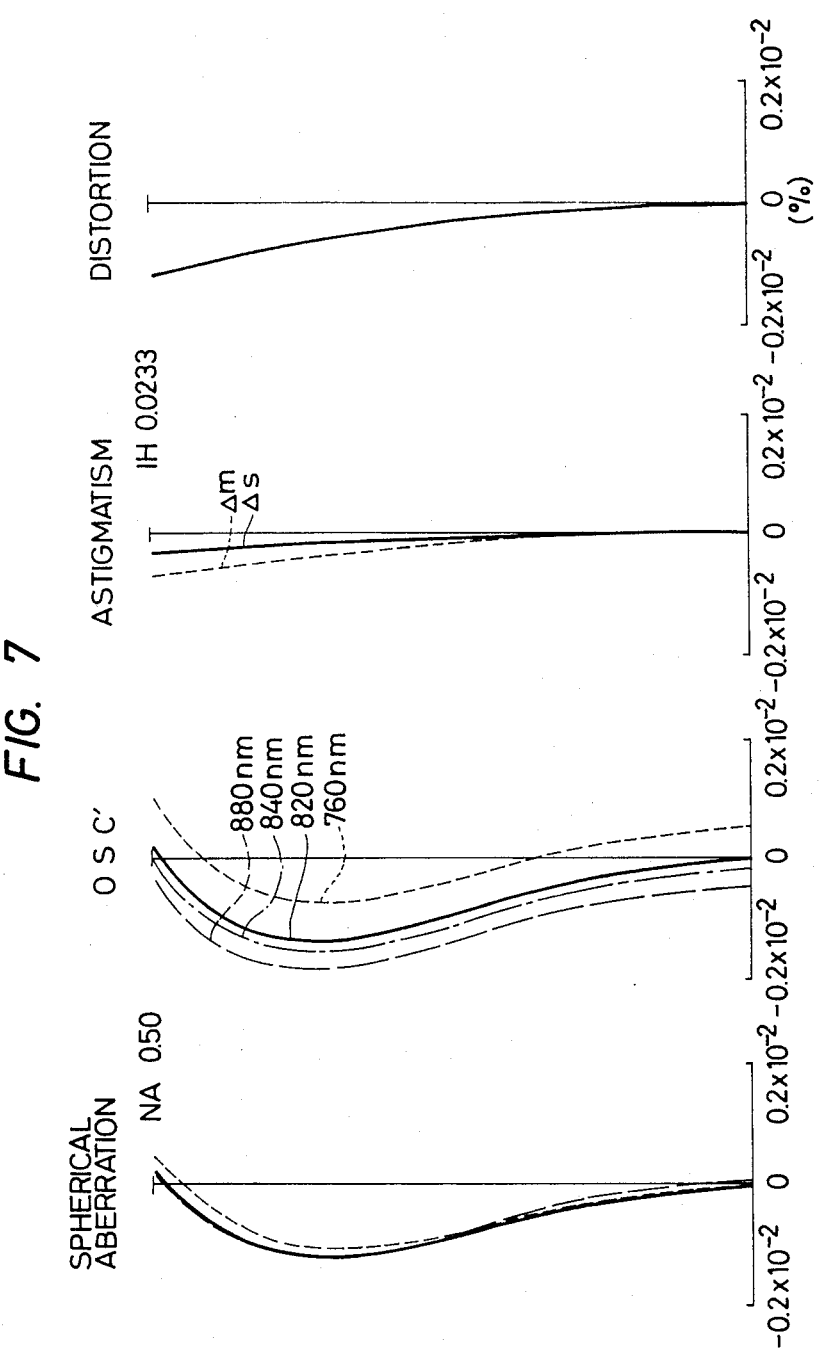
Figure 8:
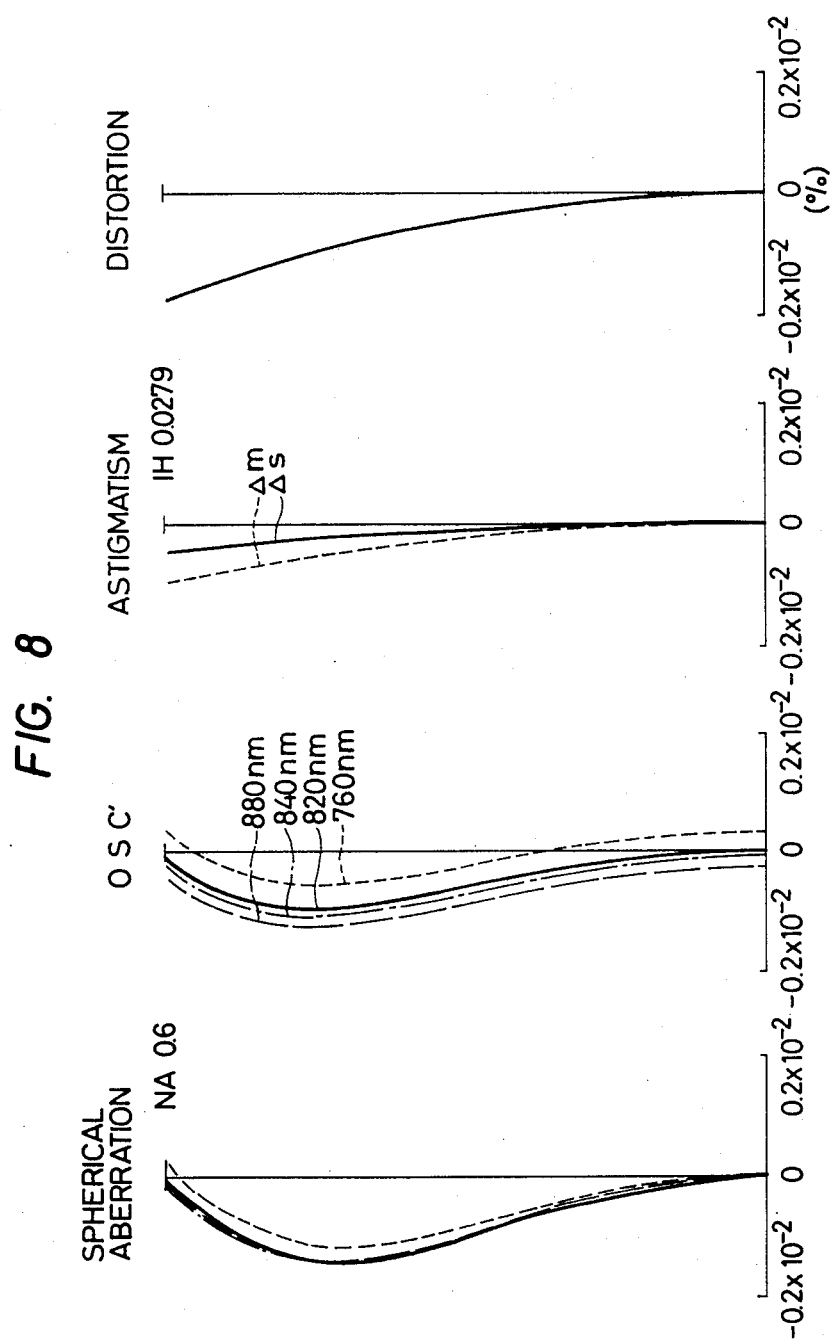

Now, preferred embodiments of the optical recording and read-out lens system for optical recording type disks according to the present invention are shown below.

Embodiment 1

$r_1 = 2.6095$
$\quad d_1 = 0.5732 \quad n_1 = 1.56873 \quad \nu_1 = 63.16$
$r_2 = -0.9411$
$\quad d_2 = 0.2047 \quad n_2 = 1.76182 \quad \nu_2 = 26.52$
$r_3 = 0.9411$
$\quad d_3 = 0.5757 \quad n_3 = 1.83481 \quad \nu_3 = 42.72$
$r_4 = -3.3316$
$\quad d_4 = 0.0256$
$r_5 = 0.7856$
$\quad d_5 = 0.3787 \quad n_4 = 1.883 \quad \nu_4 = 40.76$
$r_6 = 1.7968$
$f = 1 \quad \Sigma d = 1.7579$
$\quad t = 0.3071 \quad n_t = 1.49388$
$f^2/|r_2 \cdot r_3| = 1.1291 \quad f_4/f = 1.371$
$(n_1 - 1)\nu_1 + (n_3 - 1)\nu_3 = 70.5147$
$WD' = 0.609 \quad NA = 0.55$

Embodiment 2

$r_1 = 2.6831$
$\quad d_1 = 0.576 \quad n_1 = 1.56873 \quad \nu_1 = 63.16$
$r_2 = -0.9654$
$\quad d_2 = 0.2023 \quad n_2 = 1.76182 \quad \nu_2 = 26.52$
$r_3 = 0.9654$
$\quad d_3 = 0.5735 \quad n_3 = 1.83481 \quad \nu_3 = 42.72$
$r_4 = -3.4726$
$\quad d_4 = 0.0256$
$r_5 = 0.808$
$\quad d_5 = 0.3891 \quad n_4 = 1.883 \quad \nu_4 = 40.76$
$r_6 = 2.0481$
$f = 1 \quad \Sigma d = 1.7665$
$\quad t = 0.3840 \quad n_t = 1.49388$
$f^2/|r_2 \cdot r_3| = 1.073 \quad f_4/f = 1.343$
$(n_1 - 1)\nu_1 + (n_3 - 1)\nu_3 = 70.5147$
$WD' = 0.613 \quad NA = 0.55$

Embodiment 3

$r_1 = 2.2003$
$\quad d_1 = 0.5727 \quad n_1 = 1.56873 \quad \nu_1 = 63.16$
$r_2 = -0.8585$
$\quad d_2 = 0.2046 \quad n_2 = 1.72825 \quad \nu_2 = 28.46$
$r_3 = 0.9516$
$\quad d_3 = 0.5753 \quad n_3 = 1.83481 \quad \nu_3 = 42.72$
$r_4 = -2.9769$
$\quad d_4 = 0.0256$
$r_5 = 0.685$
$\quad d_5 = 0.3784 \quad n_4 = 1.618 \quad \nu_4 = 63.38$
$r_6 = 2.0704$
$f = 1 \quad \Sigma d = 1.7566$
$\quad t = 0.3068 \quad n_t = 1.49388$
$f^2/|r_2 \cdot r_3| = 1.2241 \quad f_4/f = 1.52$
$(n_1 - 1)\nu_1 + (n_3 - 1)\nu_3 = 70.5147$
$WD' = 0.547 \quad NA = 0.55$

Embodiment 4

$r_1 = 2.1738$
$\quad d_1 = 0.5739 \quad n_1 = 1.497 \quad \nu_1 = 81.61$
$r_2 = -0.9793$
$\quad d_2 = 0.205 \quad n_2 = 1.71736 \quad \nu_2 = 29.51$
$r_3 = 0.9513$
$\quad d_3 = 0.5765 \quad n_3 = 1.72916 \quad \nu_3 = 54.68$
$r_4 = -2.4681$
$\quad d_4 = 0.0256$
$r_5 = 0.7852$
$\quad d_5 = 0.3792 \quad n_4 = 1.883 \quad \nu_4 = 40.76$
$r_6 = 1.8749$
$f = 1 \quad \Sigma d = 1.7602$
$\quad t = 0.3075 \quad n_t = 1.49388$
$f^2/|r_2 \cdot r_3| = 1.0734 \quad f_4/f = 1.337$
$(n_1 - 1)\nu_1 + (n_3 - 1)\nu_3 = 79.6549$
$WD' = 0.624 \quad NA = 0.55$

Embodiment 5

$r_1 = 3.0961$
$\quad d_1 = 0.5208 \quad n_1 = 1.5725 \quad \nu_1 = 57.76$
$r_2 = -0.8374$
$\quad d_2 = 0.186 \quad n_2 = 1.76182 \quad \nu_2 = 26.52$
$r_3 = 0.9730$
$\quad d_3 = 0.5231 \quad n_3 = 1.83481 \quad \nu_3 = 42.72$
$r_4 = -2.9989$
$\quad d_4 = 0.0233$
$r_5 = 0.8427$
$\quad d_5 = 0.3441 \quad n_4 = 1.883 \quad \nu_4 = 40.76$
$r_6 = 2.325$
$f = 1 \quad \Sigma d = 1.5973$
$\quad t = 0.2790 \quad n_t = 1.49388$
$f^2/|r_2 \cdot r_3| = 1.2273 \quad f_4/f = 1.376$
$(n_1 - 1)\nu_1 + (n_3 - 1)\nu_3 = 67.6672$
$WD' = 0.685 \quad NA = 0.50$

Embodiment 6

$r_1 = 2.5408$
$\quad d_1 = 0.6248 \quad n_1 = 1.56873 \quad \nu_1 = 63.16$
$r_2 = -0.9948$
$\quad d_2 = 0.2232 \quad n_2 = 1.78472 \quad \nu_2 = 25.68$
$r_3 = 1.0369$
$\quad d_3 = 0.6276 \quad n_3 = 1.82026 \quad \nu_3 = 42.72$
$r_4 = -3.1218$
$\quad d_4 = 0.0279$
$r_5 = 0.8076$
$\quad d_5 = 0.4128 \quad n_4 = 1.883 \quad \nu_4 = 40.76$
$r_6 = 2.0642$
$f = 1 \quad \Sigma d = 1.9163$
$\quad t = 0.3347 \quad n_t = 1.49388$
$f^2/|r_2 \cdot r_3| = 0.9695 \quad f_4/f = 1.327$
$(n_1 - 1)\nu_1 + (n_3 - 1)\nu_3 = 70.9625$
$WD' = 0.593 \quad NA = 0.6$ In embodiments shown in the above, reference symbols $r_1$ through $r_6$ respectively represent radii of curvature of respective lens surfaces in the order from the light-source side, reference symbols $d_1$ through $d_5$ respectively represent thicknesses of respective lenses and airspaces between respective lenses in the order from the light-source side, reference symbols $n_1$, $n_2$, $n_3$ and $n_4$ respectively represent refractive indices of respective lenses at d-line in the order from the light-source side, reference symbols $\nu_1$, $\nu_2$, $\nu_3$ and $\nu_4$ respectively represent Abbe's numbers of respective lenses at d-line in the order from the light-source side, reference symbol $\Sigma d$ represents the overall length of the lens system on the optical axis, reference symbol $t$ represents the thickness of the cover glass, reference symbol $n_t$ represents the refractive index of the cover glass at d-line, reference symbol WD' represents the distance to the focal point on the disk side measured from the sixth surface, and reference symbol NA represents the numerical aperture on the disk side.

Out of respective embodiments shown in the above, Embodiments 1 and 2 are arranged so that radii of curvature $r_2$ and $r_3$ of the two cemented surfaces of the first lens component become $|r_2| = |r_3|$. Therefore, when assembling the lenses, it is not required to judge which is the front (or rear) surface of the second lens element formed as a concave lens and this is convenient for assembly. In Embodiment 2, the thickness of the cover glass is made large. Therefore, $r_6/f$ is made large due to the reason described already. For example, when Embodiments 1 and 2 are compared each other, values of parameters other than $r_6$ are approximately the same for both cases. However, $r_6$ of Embodiment 2 has larger value than that of Embodiment 1.

In Embodiment 3, the second lens component (fourth lens element) is arranged by using glass material with a low refractive index. Therefore, compared with the other embodiments, spherical aberration is slightly larger and WD' is slightly shorter. However, Embodiment 3 is also a favourable lens system which serves the object of the present invention.

In Embodiment 4, refractive indices of respective lens elements constituting the first lens component are made somewhat low on an average so that the focal length of the second lens component (fourth lens element) becomes short and WD' becomes long. Besides, as Abbe's number of the second lens element is made comparatively large, Abbe's numbers of the first and third lens elements are made considerably large in order to eliminate chromatic aberration. At that time, correction of chromatic aberration becomes difficult unless Abbe's number $\nu_2$ of the second lens element is arranged to be smaller than 35 as described before. Therefore, $\nu_2$ of Embodiment 4 is also made smaller than 35.

Embodiment 5 is an example in which NA is made small. In this embodiment, WD' is made long by making the thickness $d_6$ of the fourth lens element small.

Embodiment 6 is an example in which NA is made large. When making the focal length of the fourth lens element large, in case of this embodiment, $r_6$ is kept large and coma is thereby corrected favourably.

I claim:

1. An optical recording and read-out lens system for optical recording type disks characterized in that said optical recording and read-out lens system for optical recording type disks comprises a first and second lens component, said first lens component being a cemented lens consisting of three lens elements, i.e., a first, second and third lens elements, said first lens element being a biconvex lens, said second lens element being a biconcave lens, said third lens element being a biconvex lens, said second lens component being a positive meniscus lens arranged to be concave toward the disk side, said optical recording and read-out lens system for optical recording type disks being arranged to fulfill the following conditions:

$$0.8 < f^2/|r_2 \cdot r_3| < 1.4 \quad (1)$$

$$1.2 < f_4/f < 1.6 \quad (2)$$

$$(n_1 - 1)\nu_1 + (n_3 - 1)\nu_3 \geq 50 \quad (3)$$

wherein reference symbol f represents the focal length of the lens system as a whole, reference symbol $f_4$ represents the focal length of the second lens component, reference symbols $r_2$ and $r_3$ respectively represent radii of curvature of cemented surfaces of the first lens component, reference symbols $n_1$ and $n_3$ respectively represent refractive indices of the first and third lens elements constituting the first lens component, and reference symbols $\nu_1$ and $\nu_3$ respectively represent Abbe's numbers of the first and third lens elements constituting the first lens component.

2. An optical recording and read-out lens system for optical recording type disks according to claim 1 further fulfilling the following condition where reference symbol $\nu_2$ represents Abbe's number of said second lens component, $$\nu_2 < 35.$$

3. An optical recording and read-out lens system for optical recording type diks according to claim 2, in which said optical recording and read-out lens system for optical recording type disks has the following numerical data:

| | | | |
|---|---|---|---|
| $r_1 = 2.6095$ | | | |
| | $d_1 = 0.5732$ | $n_1 = 1.56873$ | $\nu_1 = 63.16$ |
| $r_2 = -0.9411$ | | | |
| | $d_2 = 0.2047$ | $n_2 = 1.76182$ | $\nu_2 = 26.52$ |
| $r_3 = 0.9411$ | | | |
| | $d_3 = 0.5757$ | $n_3 = 1.83481$ | $\nu_3 = 42.72$ |
| $r_4 = -3.3316$ | | | |
| | $d_4 = 0.0256$ | | |
| $r_5 = 0.7856$ | | | |
| | $d_5 = 0.3787$ | $n_4 = 1.883$ | $\nu_4 = 40.76$ |
| $r_6 = 1.7968$ | | | |
| $f = 1$ | | | |
| $f^2/|r_2 \cdot r_3| = 1.1291$ | $f_4/f = 1.371$ | | |
| $(n_1 - 1)\nu_1 + (n_3 - 1)\nu_3 = 70.5147$ | | | |
| WD' $= 0.609$ | NA $= 0.55$ | | | wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses, reference symbol WD' represents the focal length on the disk side measured from the sixth surface, and reference symbol NA represents the numerical aperture.

4. An optical recording and read-out lens system for optical recording type disks according to claim 2, in which said optical recording and read-out lens system for optical recording type disks has the following numerical data:

| | | | |
|---|---|---|---|
| $r_1 = 2.6831$ | | | |
| | $d_1 = 0.576$ | $n_1 = 1.56873$ | $\nu_1 = 63.16$ |
| $r_2 = -0.9654$ | | | |
| | $d_2 = 0.2023$ | $n_2 = 1.76182$ | $\nu_2 = 26.52$ |
| $r_3 = 0.9654$ | | | |
| | $d_3 = 0.5735$ | $n_3 = 1.83481$ | $\nu_3 = 42.72$ |
| $r_4 = -3.4726$ | | | |
| | $d_4 = 0.0256$ | | |
| $r_5 = 0.808$ | | | |
| | $d_5 = 0.3891$ | $n_4 = 1.883$ | $\nu_4 = 40.76$ |
| $r_6 = 2.0481$ | | | |
| $f = 1$ | | | |
| $f^2/|r_2 \cdot r_3| = 1.073$ | $f_4/f = 1.343$ | | |
| $(n_1 - 1)\nu_1 + (n_3 - 1)\nu_3 = 70.5147$ | | | |
| WD' $= 0.613$ | NA $= 0.55$ | | | wherein reference symbols $r_1$ through $r_6$ respectively represent radii of curvature of respective lens surfaces, reference symbols $d_1$ through $d_5$ respectively represent thisknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses, reference symbol WD' represents the focal length on the disk side measured from the sixth surface, and reference symbol NA represents the numerical aperture.

5. An optical recording and read-out lens system for optical recording type disks according to claim 2, in which said optical recording and read-out lens system for optical recording type disks has the following numerical data:

$r_1 = 2.2003$
$\quad d_1 = 0.5727 \quad n_1 = 1.56873 \quad \nu_1 = 63.16$
$r_2 = -0.8585$
$\quad d_2 = 0.2046 \quad n_2 = 1.72825 \quad \nu_2 = 28.46$
$r_3 = 0.9516$
$\quad d_3 = 0.5753 \quad n_3 = 1.83481 \quad \nu_3 = 42.72$
$r_4 = -2.9769$
$\quad d_4 = 0.0256$
$r_5 = 0.685$
$\quad d_5 = 0.3784 \quad n_4 = 1.618 \quad \nu_4 = 63.38$
$r_6 = 2.0704$
$f = 1$
$f^2/|r_2 \cdot r_3| = 1.2241 \quad f_4/f = 1.52$
$(n_1 - 1)\nu_1 + (n_3 - 1)\nu_3 = 70.5147$
$WD' = 0.547 \quad NA = 0.55$ wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$, $n_3$, and $n_4$ respectively represent refractive indices of respective lenses, reference symbols $\nu_1$, $\nu_2$, $\nu_3$ and $\nu_4$ respectively represent Abbe's numbers of respective lenses, reference symbol WD' represents the focal length on the disk side measured from the sixth surface, and reference symbol NA represents the numerical aperture.

6. An optical recording and read-out lens system for optical recording type disks according to claim 2, in which said optical recording and read-out lens system for optical recording type disks has the following numerical data:

$r_1 = 2.1738$
$\quad d_1 = 0.5739 \quad n_1 = 1.497 \quad \nu_1 = 81.61$
$r_2 = -0.9793$
$\quad d_2 = 0.205 \quad n_2 = 1.71736 \quad \nu_2 = 29.51$
$r_3 = 0.9513$
$\quad d_3 = 0.5765 \quad n_3 = 1.72916 \quad \nu_3 = 54.68$
$r_4 = -2.4681$
$\quad d_4 = 0.0256$
$r_5 = 0.7852$
$\quad d_5 = 0.3792 \quad n_4 = 1.883 \quad \nu_4 = 40.76$
$r_6 = 1.8749$
$f = 1$
$f^2/|r_2 \cdot r_3| = 1.0734 \quad f_4/f = 1.337$
$(n_1 - 1)\nu_1 + (n_3 - 1)\nu_3 = 79.6549$
$WD' = 0.624 \quad NA = 0.55$ wherein reference symbols $r_1$ through $r_6$ respectively represent radii of curvature of respective lens surfaces, reference symbols $d_1$ through $d_5$ respectively represent thicknesses of respective lenses and airspaces between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses, reference symbol WD' represents the focal length on the disk side measured from the sixth surface, and reference symbol NA represents the numerical aperture.

7. An optical recording and read-out lens system for optical recording type disks according to claim 2, in which said optical recording and read-out lens system for optical recording type disks has the following numerical data:

$r_1 = 3.0961$
$\quad d_1 = 0.5208 \quad n_1 = 1.5725 \quad \nu_1 = 57.76$
$r_2 = -0.8374$
$\quad d_2 = 0.186 \quad n_2 = 1.76182 \quad \nu_2 = 26.52$
$r_3 = 0.9730$
$\quad d_3 = 0.5231 \quad n_3 = 1.83481 \quad \nu_3 = 42.72$
$r_4 = -2.9989$
$\quad d_4 = 0.0233$
$r_5 = 0.8427$
$\quad d_5 = 0.3441 \quad n_4 = 1.883 \quad \nu_4 = 40.76$
$r_6 = 2.325$
$f = 1$
$f^2/|r_2 \cdot r_3| = 1.2273 \quad f_4/f = 1.376$
$(n_1 - 1)\nu_1 + (n_3 - 1)\nu_3 = 67.6672$
$WD' = 0.685 \quad NA = 0.50$ wherein reference symbols $r_1$ through $r_6$ respectively represent radii of curvature of respective lens surfaces, reference symbols $d_1$ through $d_5$ respectively represent thicknesses of respective lenses and airspases between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses, reference symbol WD' represents the focal length on the disk side measured from the sixth surface, and reference symbol NA represents the numerical aperture.

8. An optical recording and read-out lens system for optical recording type disks according to claim 2, in which said optical recording and read-out lens system for optical recording type disks has the following numerical data:

$r_1 = 2.5408$
$\quad d_1 = 0.6248 \quad n_1 = 1.56873 \quad \nu_1 = 63.16$
$r_2 = -0.9948$
$\quad d_2 = 0.2232 \quad n_2 = 1.78472 \quad \nu_2 = 25.68$
$r_3 = 1.0369$
$\quad d_3 = 0.6276 \quad n_3 = 1.82026 \quad \nu_3 = 42.72$
$r_4 = -3.1218$
$\quad d_4 = 0.0279$
$r_5 = 0.8076$
$\quad d_5 = 0.4128 \quad n_4 = 1.883 \quad \nu_4 = 40.76$
$r_6 = 2.0642$
$f = 1$
$f^2/|r_2 \cdot r_3| = 0.9695 \quad f_4/f = 1.327$
$(n_1 - 1)\nu_1 + (n_3 - 1)\nu_3 = 70.9625$
$WD' = 0.593 \quad NA = 0.6$ wherein reference symbols $r_1$ through $r_6$ respectively represent radii of curvature of respective lens surfaces, reference symbols $d_1$ through $d_5$ respectively represent thicknesses of respective lenses and airspases between respective lenses, reference symbols $n_1$, $n_2$, $n_3$ and $n_4$ respectively represent refractive indices of respective lenses, reference symbols $\nu_1$, $\nu_2$, $\nu_3$ and $\nu_4$ respectively represent Abbe's numbers of respective lenses, reference symbol WD' represents the focal length on the disk side measured from the sixth surface, and reference symbol NA represents the numerical aperture.

* * * * *